United States Patent
McKenney et al.

(10) Patent No.: US 7,873,612 B2
(45) Date of Patent: Jan. 18, 2011

(54) ATOMICALLY MOVING LIST ELEMENTS BETWEEN LISTS USING READ-COPY UPDATE

(75) Inventors: Paul E. McKenney, Beaverton, OR (US); Orran Y. Krieger, Newton, MA (US); Dipankar Sarma, Bangalore (IN); Maneesh Soni, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 414 days.

(21) Appl. No.: 11/870,668

(22) Filed: Oct. 11, 2007

(65) Prior Publication Data

US 2008/0033952 A1 Feb. 7, 2008

Related U.S. Application Data

(62) Division of application No. 10/995,657, filed on Nov. 23, 2004, now abandoned.

(51) Int. Cl.
 G06F 7/00 (2006.01)
 G06F 17/00 (2006.01)
(52) U.S. Cl. ..................................................... 707/704
(58) Field of Classification Search .................. 707/704, 707/999.008
 See application file for complete search history.

(56) References Cited

U.S. PATENT DOCUMENTS

| | | | |
|---|---|---|---|
| 5,287,521 A | 2/1994 | Nitta et al. | |
| 5,454,101 A | 9/1995 | Mackay et al. | |
| 5,727,209 A | 3/1998 | Slingwine et al. | |
| 6,055,538 A | 4/2000 | Kessenich et al. | |
| 6,112,222 A | 8/2000 | Govindaraju et al. | |
| 7,231,436 B1 | 6/2007 | Dalfo et al. | |
| 2002/0059165 A1 | 5/2002 | Hersh et al. | |

OTHER PUBLICATIONS

Mckenney et al., "Read-copy update: using execution history to solve concurrency problems", Parallel and Distributed Computing and Systems, Oct. 1998.*

Paul E. McKenney et al., "Scaling dcache with RCU", Linux Journal (Jan. 1, 2004).

* cited by examiner

*Primary Examiner*—Neveen Abel Jalil
*Assistant Examiner*—Michael J Hicks
(74) *Attorney, Agent, or Firm*—Walter W. Duft

(57) ABSTRACT

A system, method and computer program product for atomically moving a shared list element from a first list location to a second list location includes inserting a placeholder element at the second list location to signify to readers that a move operation is underway, removing the shared list element from the first list location, re-identifying the list element to reflect its move from the first list location to the second list location, inserting it at the second list location and unlinking the placeholder element. A deferred removal of the placeholder element is performed following a period in which readers can no longer maintain references thereto. A method, system and computer program product are additionally provided for performing a lookup of a target list element that is subject to being atomically moved from a first list to a second list.

15 Claims, 13 Drawing Sheets

ATOMICALLY MOVING LIST ELEMENTS BETWEEN LISTS USING READ-COPY UPDATE

CROSS REFERENCE TO RELATED APPLICATIONS

This application is a divisional under 35 U.S.C. 121 of copending U.S. application Ser. No. 10/995,657 filed on Nov. 23, 2004.

BACKGROUND OF THE INVENTION

1. Field of the Invention

The present invention relates to computer systems and methods in which list data are shared by software running concurrently on one or more processors. More particularly, the invention concerns an improved system and method that allows lock-free lookups of list elements while efficiently permitting concurrent update operations in which list elements are moved from one list to another.

2. Description of the Prior Art

By way of background, shared data elements that are members of a linked list sometimes need to be moved from one list to another while maintaining consistency for the benefit of data consumers who may be concurrently performing look-ups on the same data. This situation arises in the context of in-memory file system tree images used by operating systems to perform file name lookups for locating files maintained on block storage devices. When a file's name is changed and/or the file is moved from one directory to another (referred to as a "rename" operation), its corresponding entry in the file system tree image will often move between lists. For example, in a typical directory entry cache, directory entry elements (representing files) are assigned to doubly-linked circular directory lists. Each such list is headed by a parent directory entry whose files are represented by the directory entries in the list. Relocating a file from one directory to another will cause its directory entry to move from one directory list to another. Similarly, in a directory entry hash table, directory entries are assigned to hash chains (lists) according to a hash algorithm based on their name and name of their parent directory. Directory entries will typically move from one hash chain to another whenever the file's name is changed or it is relocated to another directory.

Techniques must be used to perform these list operations without impacting readers who may be concurrently performing look-ups on the same file. Moreover, in computing environments conforming to the POSIX (Portable Operating System Interface), the list manipulations must be performed atomically. This atomicity requirement is illustrated in the context of the POSIX rename( ) system call by considering the situation where the rename( ) operation races with concurrent lookups of the old file name and the new file name. If a lookup of the new name succeeds, then every subsequent lookup of the old name must fail. Similarly, if a lookup of the old name fails, then every subsequent lookup of the new name must succeed. Note that a "subsequent" lookup must start after a preceding lookup completes. This is summarized in the following table, in which the term "failed" signifies a failure to open the file being renamed:

TABLE 1

| POSIX rename( ) atomicity conditions | | |
|---|---|---|
| Rename ("old", "new") | If open ("old") failed, Then open ("new") must succeed | If open ("new") succeeded, Then open ("old") must fail. |

The atomicity requirements for the POSIX rename( ) system call are the same whether a file is being renamed to a new name, and when a file is being renamed on top of a pre-existing file. In the latter case, an "early" attempt to open the new filename (i.e., before the rename( ) operation returns) will fail to open the renamed file, but will instead open the pre-existing file. This race condition is in all ways equivalent to the race condition where the file is being renamed to a new name. Therefore, for simplicity, the ensuing discussion will consider only the case where a file is renamed to a new name.

There are a number of prior-art algorithms that permit atomic rename( ) operations by relying on locks held during the lookup operations. This is undesirable because directory cache lookups are extremely common, and such operations should be lock-free if possible. There are also lock-free synchronization techniques that provide the desired semantics, and avoid locking in the lookups. However, these rename( ) operations are extremely costly, requiring duplication of the entire data structure (which for a hash table can contain hundreds of thousands of elements, even on small desktop systems). Furthermore, even though the lookups are lock-free, they use atomic operations that perform write operations, thereby inflicting costly cache misses on lookups running in other processors.

Another mutual exclusion technique, known as read-copy update, permits shared data to be accessed for reading without the use of locks, writes to shared memory, memory barriers, atomic instructions, or other computationally expensive synchronization mechanisms, while still permitting the data to be updated concurrently. The technique is well suited to multi-processor computing environments in which the number of read operations (readers) accessing a shared data set is large in comparison to the number of update operations (updaters), and wherein the overhead cost of employing other mutual exclusion techniques (such as locks) for each read operation would be high.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

Traditional read-copy-update manipulation of list data leaves the old data element in place in the list, creates a new copy with the desired modifications, and then atomically inserts the new copy in place of the old element into the same list. This is impractical for the POSIX rename( ) operation. Here, the old element must be atomically removed and a new element inserted, not necessarily in the same place that the old one occupied, but likely into a different list. File system operations further complexify traditional read-copy update due to the existence of long-lived references to the old list element (directory entry representing the file) that is to be removed following a grace period. It is often difficult or even infeasible to determine where these references are located, because many different parts of an operating system kernel or of dynamically loaded kernel modules might at any time acquire a reference to the list element. Thus, there is no effective method for tracking down all the possible references to the old element.

A possible work-around would be to have read-copy update atomically update an entire file system tree data structure, and atomically replace it with a new one by switching pointers. However, as in the case of lock-free synchronization, this latter approach is hopelessly inefficient for directories containing large numbers of files, and is even less well suited to systems that maintain a hash table to cache filename/directory mappings. As stated, it is not unusual for even small desktop machines to cache more than 100,000 such mappings. Making a new duplicate copy of this table for each rename( ) operation is clearly undesirable. Another alternative, creating a copy of a single hash chain is not feasible because the rename( ) operation will normally move a directory entry to some other hash chain. It is also not possible to atomically create a copy of only the affected pair of hash chains with the instructions available on commodity microprocessors.

In sum, given current commodity microprocessor instruction sets, along with the undesirability of duplicating large list structures, it is not practical to atomically move an element from one list to another using traditional read-copy update techniques. If the POSIX rename( ) operation is not performed atomically, there will be a short but non-zero duration when the renamed directory entry will not be on any list. This time duration can be expanded by interrupts, ECC (Error Correction Code) errors in memory or caches, or by many other events that can occur in current microprocessors and operating systems. In a multiprocessor system, it is possible that some other process might be able to perform a lookup on the new name followed by the old name during this time interval and observe both failing, thus violating the required POSIX semantics as shown in the second column of Table 1.

Accordingly, a need exists for an efficient lock-free technique for atomically moving shared list elements from one list to another. It would be particularly desirable to provide a solution to the foregoing problem using existing aspects of the conventional read-copy update technique but with modifications thereto to facilitate inter-list movement of list elements with the required atomicity.

SUMMARY OF THE INVENTION

The foregoing problems are solved and an advance in the art is obtained by a method, system and computer program product for atomically moving a shared list element from a first list location to a second list location while permitting lock-free concurrent lookup operations. To perform the atomic move operation, a placeholder element is inserted at the second list location to signify to readers that a move operation is underway, and the shared list element is removed from the first list location. The shared list element is then re-identified to reflect its move from the first list location to the second list location. It is inserted at the second list location and the placeholder element is unlinked. A deferred removal of the placeholder element is performed following a period in which readers can no longer maintain references to the placeholder element. Readers that were waiting on the placeholder element will fail and presumably be retried, at which point the shared list element will be found at its new location.

In exemplary embodiments of the invention, the placeholder element includes a flag that indicates when the move operation has completed, and readers performing lookups use a mechanism, such as a semaphore, an event queue, or a wait queue, to wait until the flag signifies completion before returning. The placeholder element further includes a reference count representing a count of readers maintaining references to the placeholder element (and thus waiting for completion of the move operation). This reference count is used in conjunction with read-copy update to defer release of the placeholder element until all readers have completed processing thereof.

The shared list element is not limited to any particular type of data, but one of its uses is in a doubly-linked circular list of directory entries in a file system directory entry cache. The shared list element could also be a member of a directory entry hash table chain. In both cases, the move operation can be part of a file rename( ) operation. A further example of the shared list element would be an individual row element in a relational database tuple. Many other list environments would likewise be candidates for implementation of the present invention.

A method, system and computer program product are additionally provided for performing a lookup of a shared list element that is subject to being atomically moved from a first list to a second list. The lookup initiates a list traversal beginning at a first list element. Upon encountering a list element that is the target of the lookup, the lookup returns success. Upon encountering a list element that is a placeholder for the lookup target that was generated as a result of a concurrent move operation involving the target, the lookup waits until the placeholder indicates that the move operation has completed. When this occurs, the lookup returns failure so that the lookup can be retried. Upon the target list element or the placeholder not being found in the list, the lookup returns failure.

In exemplary embodiments of the invention, the lookup further includes maintaining a count of elements traversed by the lookup and asserting a lock against concurrent move operations if the count reaches a computed maximum. The lookup may additionally include determining whether the lookup has been pulled from one list to another as a result of a concurrent move, and if true, returning to the initial list being traversed. The lookup increments a reference count in the placeholder upon encountering the placeholder and decrements the reference count if the placeholder indicates that the concurrent move operation has competed. When waiting on the placeholder, the lookup can block on a global or per-element semaphore, or spin (busy wait) on a global or per-element lock.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Before discussing the details of the invention in its exemplary embodiments, it will be helpful to consider several examples illustrating the manner in which conventional read-copy update can be used to update list elements. FIGS. 1A-1D illustrate one such situation wherein a data element B in a group of data elements A, B and C is to be modified. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list.

Figure 1A:
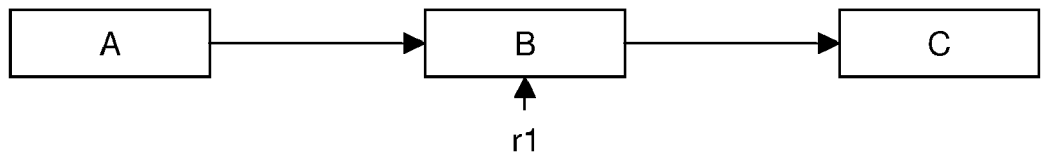
FIGS. 1A-1D are diagrammatic representations of a linked list of data elements undergoing a data element replacement according to a conventional read-copy update mechanism.
Figure 1B:
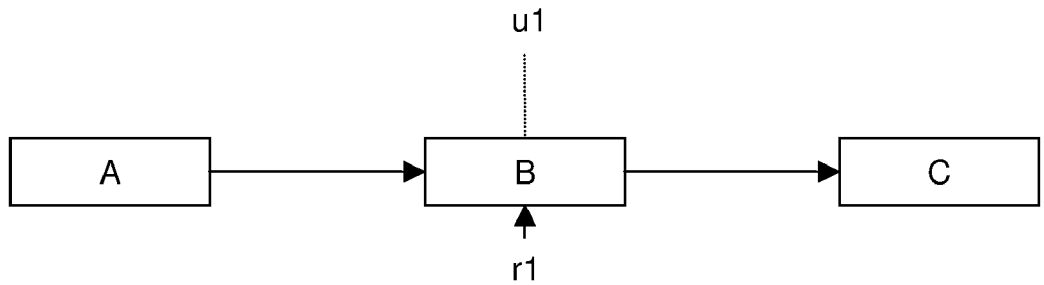
Figure 1C:
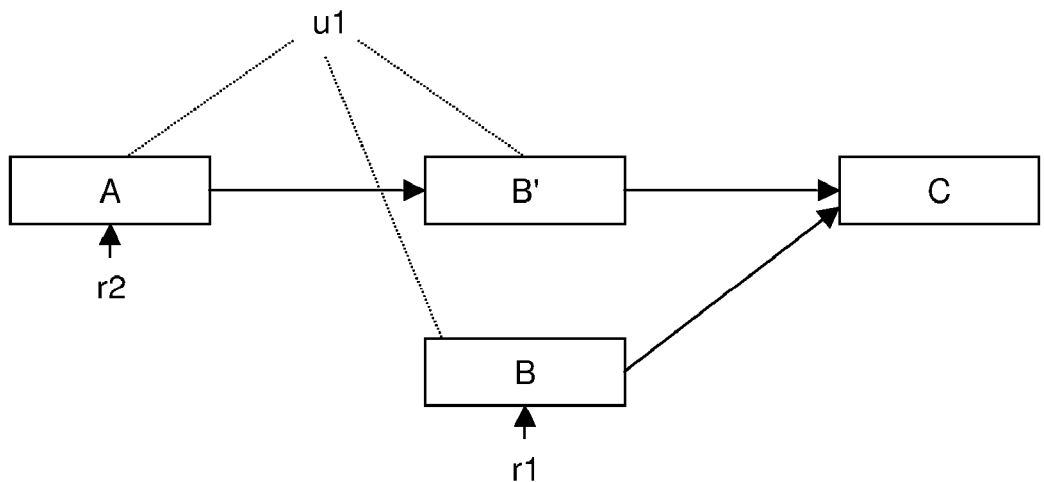

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring a spinlock, allocating new memory for B', copying the contents of B to B', modifying B' as needed, updating the pointer from A to B so that it points to B', and releasing the spinlock. All subsequent (post update) readers that traverse the linked list, such as the reader r2, will thus see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
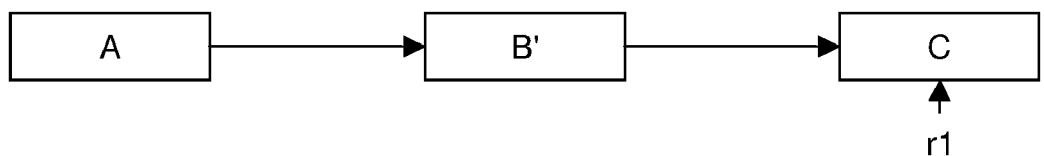

At some subsequent time following the update, r1 will have continued its traversal of the linked list and moved its reference off of B. In addition, there will be a time at which no other reader process is entitled to access B. It is at this point, representing expiration of a grace period, that u1 can free B, as shown in FIG. 1D.

Figure 2A:
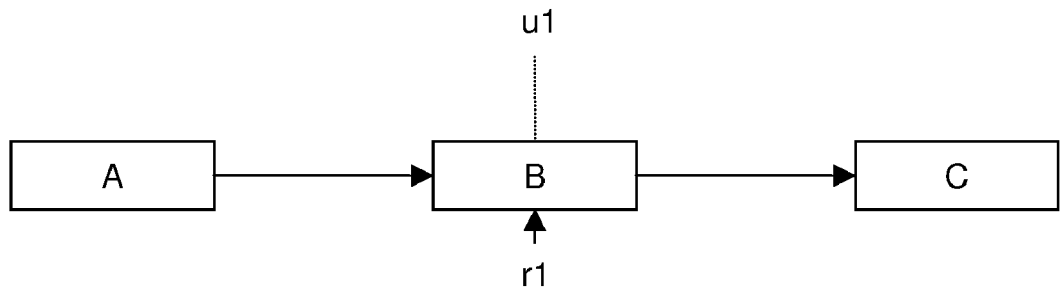
FIGS. 2A-2C are diagrammatic representations of a linked list of data elements undergoing a data element deletion according to a conventional read-copy update mechanism.
Figure 2B:
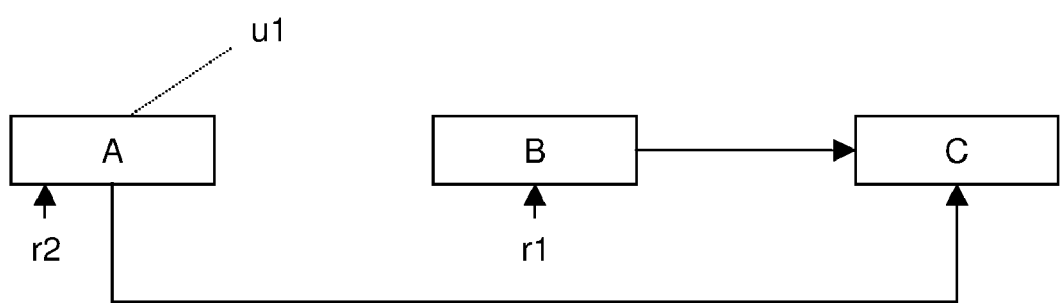
Figure 2C:

FIGS. 2A-2C illustrate the use of read-copy update to delete a data element B in a singly-linked list of data elements A, B and C. As shown in FIG. 2A, a reader r1 is assumed to be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of a grace period.

In the context of traditional read-copy update, a grace period represents the point at which all running processes having access to a data element guarded by read-copy update have passed through a "quiescent state" in which they can no longer maintain references to the data element, assert locks thereon, or make any assumptions about data element state. For many types of shared data, a context (process) switch, an idle loop, and user mode execution all represent quiescent states for any given CPU (as can other operations that will not be listed here).

Figure 3:
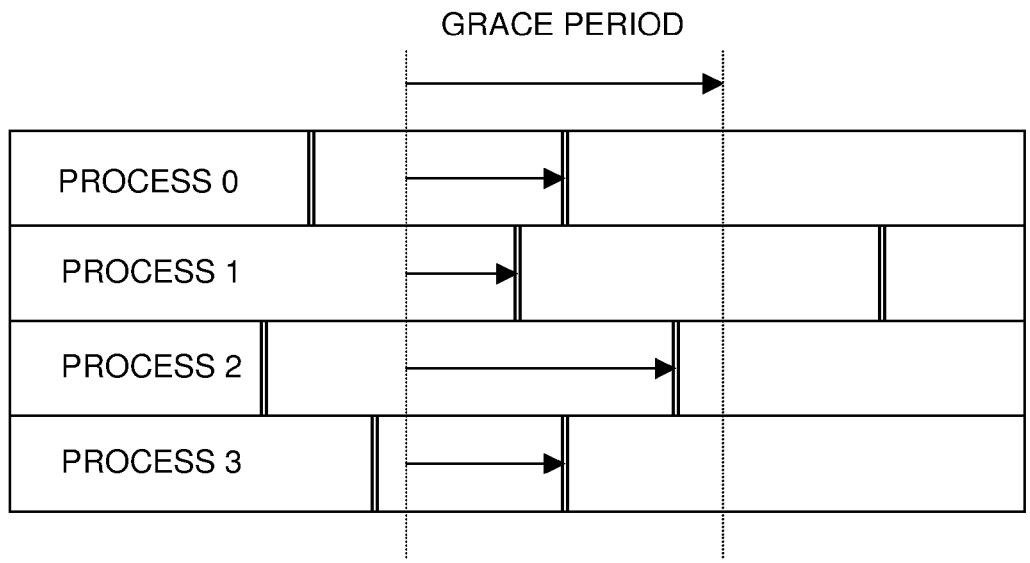
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring." The contents of U.S. Pat. No. 5,727,209 are hereby incorporated herein by this reference.

The callback processing technique contemplates that an updater of a shared data element will perform the initial (first phase) data update operation that creates the new view of the data being updated, and then specify a callback function for performing the deferred (second phase) data update operation that removes the old view of the data being updated. The updater will register the callback function (hereinafter referred to as a callback) with a read-copy update subsystem so that it can be executed at the end of the grace period. The read-copy update subsystem keeps track of pending callbacks for each processor and monitors per-processor quiescent state activity in order to detect when a current grace period has expired. When it does, all scheduled callbacks that are ripe for processing are executed.

The present invention represents an extension of the read-copy update mutual exclusion technique wherein, instead of replacing an old list element with a new one, the old element is atomically moved to a new list location so that the references to this element need not be changed. The invention achieves this effect by inserting a temporary placeholder element, referred to as a "birthstone," at the destination location where the real list element is to be moved. Lookups finding the birthstone will wait until the move operation is complete before returning failure. The birthstone element is maintained until it is replaced by the actual element being moved. At this point, the birthstone is marked "complete." Readers waiting on the birthstone "complete" state will then fail but a retry of the lookup will be attempted and the actual element will be successfully found at its new location. It is thus guaranteed that any lookup that fails to find the old element will subsequently find the new one, consistent with POSIX requirements, after the element is inserted into its new location (e.g., a new directory list or a new hash chain, depending on the implementation). As described in more detail below, reference counts and read-copy update are used to guarantee that concurrent lookups see valid state information at all points.

Figure 4:
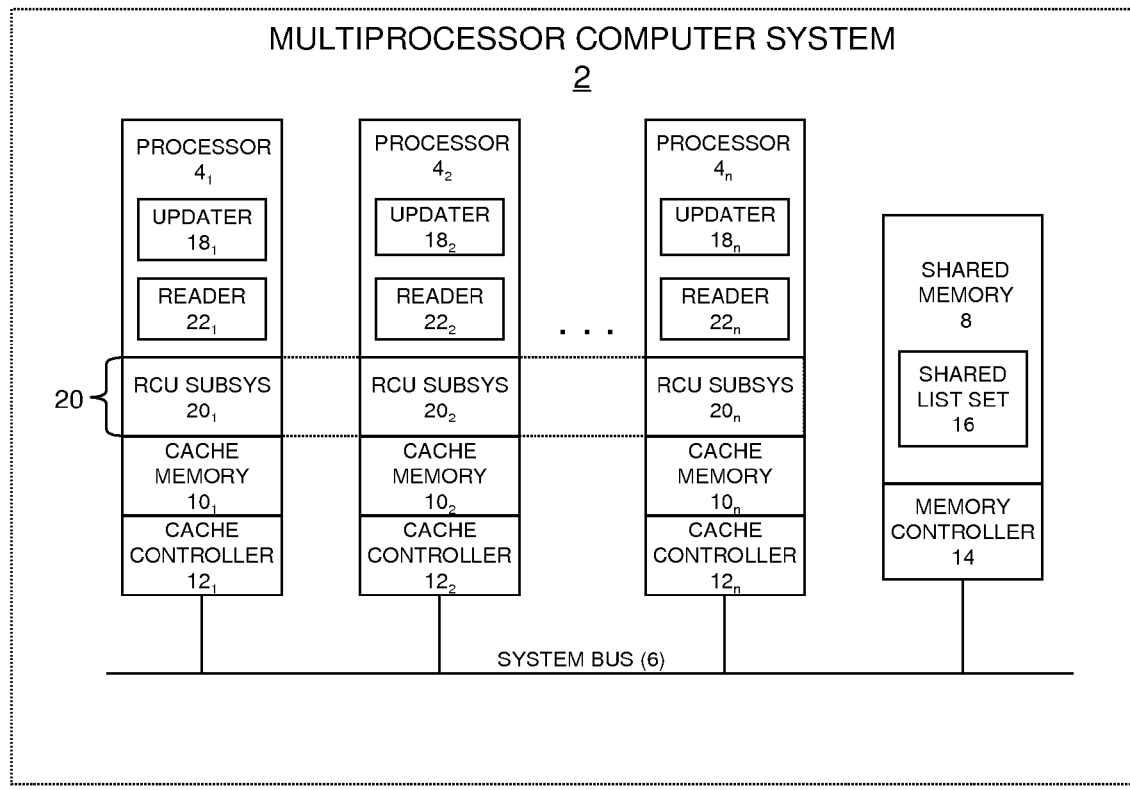
FIG. 4 is a functional block diagram showing a multiprocessor computing system that represents one exemplary environment in which the present invention can be implemented.

Turning now to FIG. 4, an exemplary computing environment in which the present invention may be implemented is illustrated. In particular, a symmetrical multiprocessor (SMP) computing system 2 is shown in which multiple processors $4_1, 4_2 \ldots 4_n$ are connected by way of a common system bus 6 to a shared memory 8. Respectively associated with each processor $4_1, 4_2 \ldots 4_n$ is a conventional cache memory $10_1, 10_2 \ldots 10_n$ and a cache controller $12_1, 12_2 \ldots 12_n$. A conventional memory controller 14 is associated with the shared memory 8. The computing system 2 is assumed to be under the management of a single multitasking operating system adapted for use in an SMP environment.

It is further assumed that update operations executed within processes, threads, or other execution contexts will periodically perform updates on a shared set of linked lists 16 stored in the shared memory 8. By way of example only, the shared list set 16 could be a directory entry cache or hash table and the lists thereof could contain file system directory entry elements. It will be appreciated that the invention may also be used in connection with many other types of lists. Reference numerals $18_1, 18_2 \ldots 18_n$ illustrate individual data update operations (updaters) that may periodically execute on the several processors $4_1, 4_2 \ldots 4_n$. In the present case, the updates performed by the updaters $18_1, 18_2 \ldots 18_n$ involve moving a list element from one list to another, such as could occur if a directory entry element is renamed and moved between lists in a directory entry cache or hash table. In that case, the renaming of an element would in many cases cause it to hash to a different hash chain. To facilitate such updates, the several processors $4_1, 4_2 \ldots 4_n$ are programmed to implement a read-copy update (RCU) subsystem 20, as by periodically executing respective read-copy update instances $20_1, 20_2 \ldots 20_n$ as part of their operating system functions.

The processors $4_1, 4_2 \ldots 4_n$ also execute readers $22_1, 22_2 \ldots 22_n$, that perform lookup operations on the shared list set 16. Each lookup operation is assumed to entail an element-by-element traversal of a linked list until an element which is the target of the lookup is found. If the shared list set 16 is a directory entry cache or hash table, the linked list being traversed will be selected according to the name and parent directory of the lookup target. Such lookup operations will typically be performed far more often than updates, thus satisfying one of the premises underlying the use of read-copy update.

Figure 5:
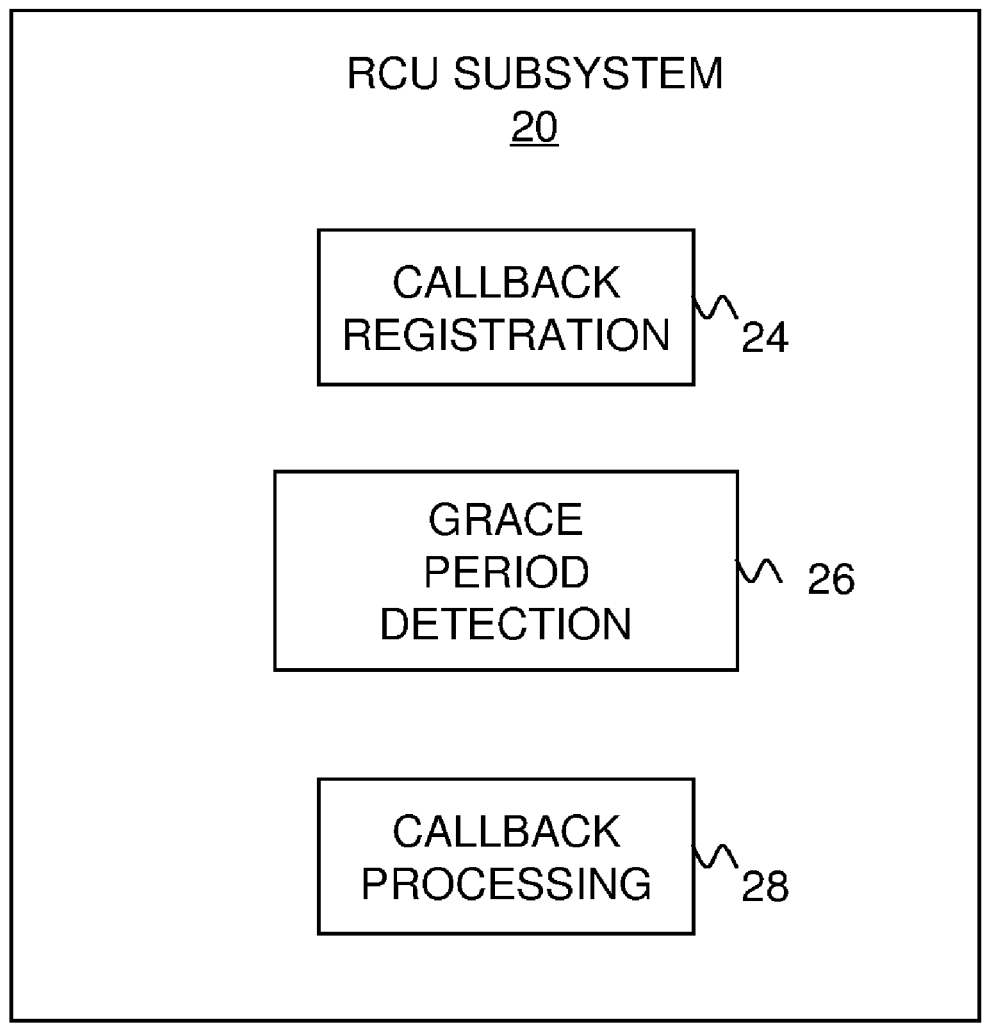
FIG. 5 is a functional block diagram showing a read-copy update subsystem implemented by each processor in the multiprocessor computer system of FIG. 4.

As shown in FIG. 5, each of the read-copy update subsystem instances $20_1, 20_2 \ldots 20_n$ includes a callback registration component 24. The callback registration component 24 serves as an API (Application Program Interface) to the read-copy update subsystem 20 that can be called by the updaters $18_2 \ldots 18_n$ to register requests for deferred (second phase) data element updates following initial (first phase) updates performed by the updaters themselves. As is known in the art, these deferred update requests involve the removal of stale data elements, and will be handled as callbacks within the read-copy update subsystem 20. Each of the read-copy update subsystem instances $20_1, 20_2 \ldots 20_n$ additionally includes a conventional read-copy update grace period detection mechanism 26, together with a callback processing mechanism 28 adapted to process callbacks registered by the updaters $18_1, 18_2 \ldots 18_n$. Note that the functions 26 and 28 can be implemented as part of a kernel scheduler, as is conventional.

Overview Of Atomic Move of List Element Between Lists Using Read-Copy Update

Figure 6A:
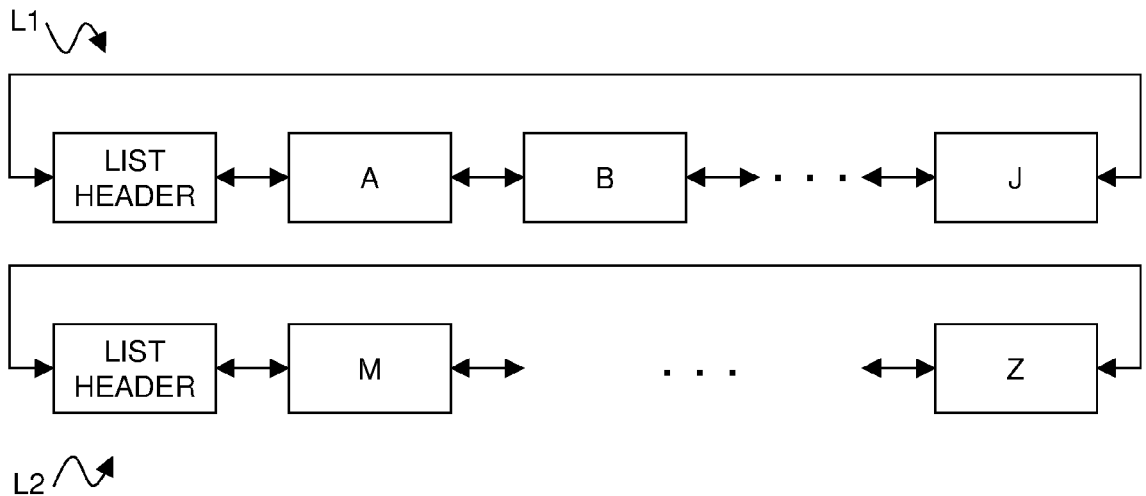
FIG. 6A-6F are diagrammatic representations showing the state of two lists as a list element on one list is moved to the other list in accordance with the invention.
Figure 6B:
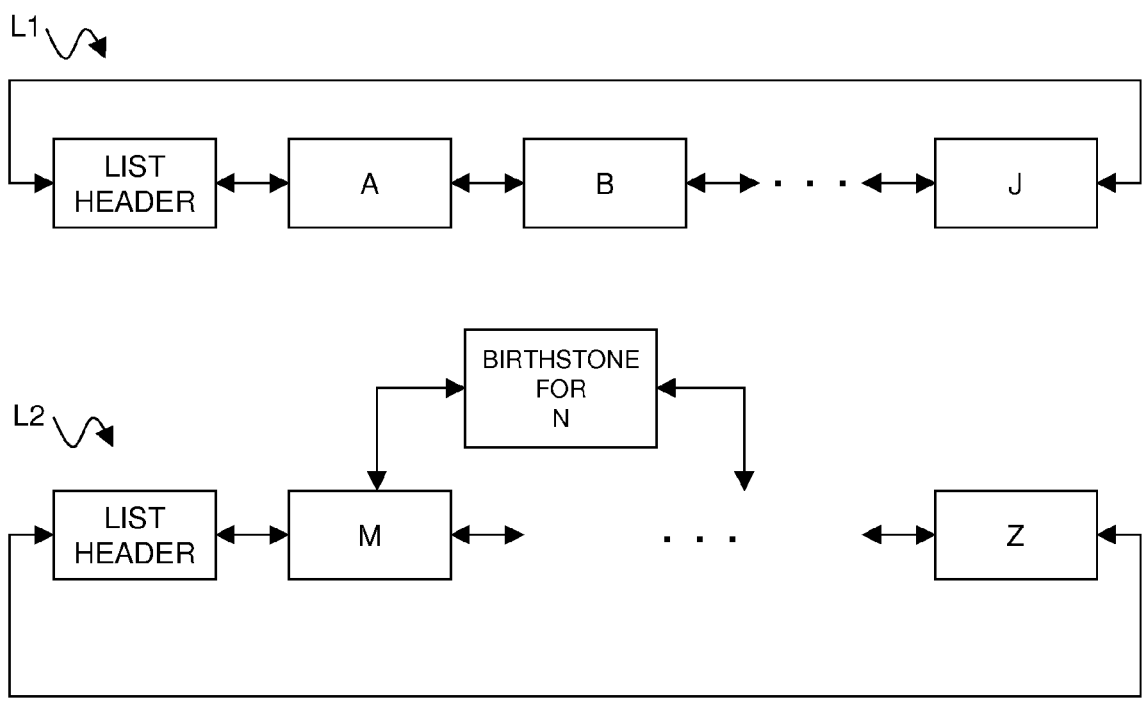
Figure 6C:
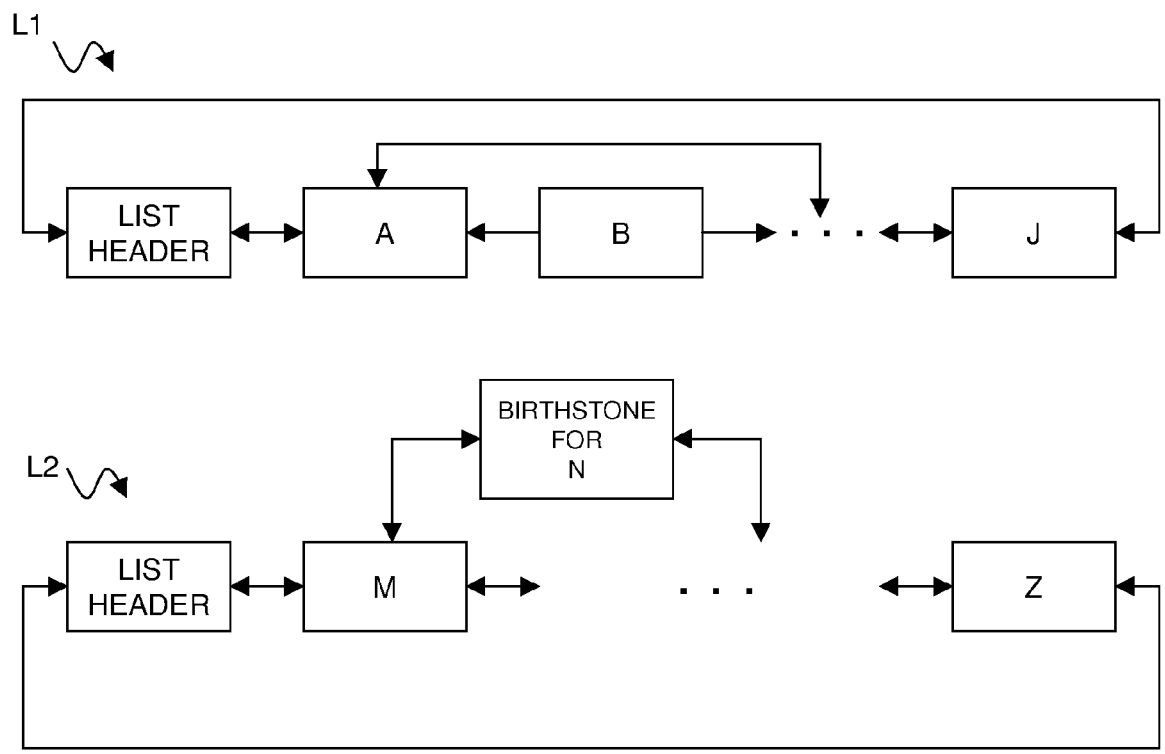
Figure 6D:
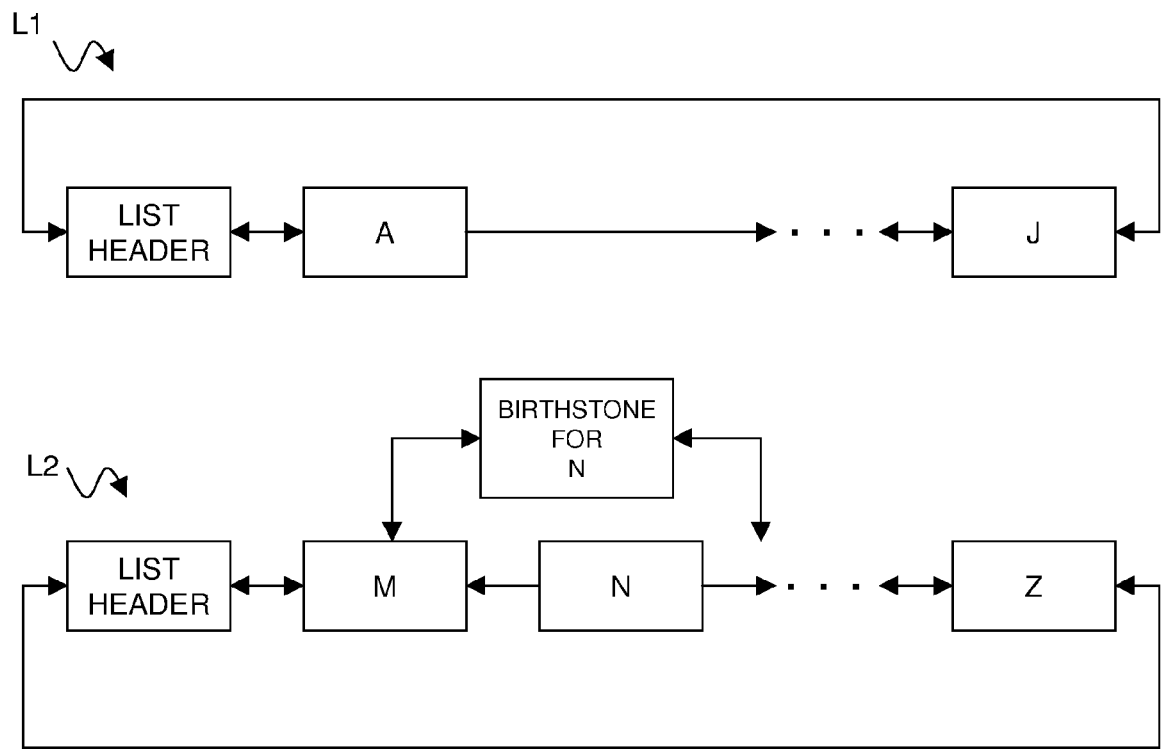
Figure 6E:
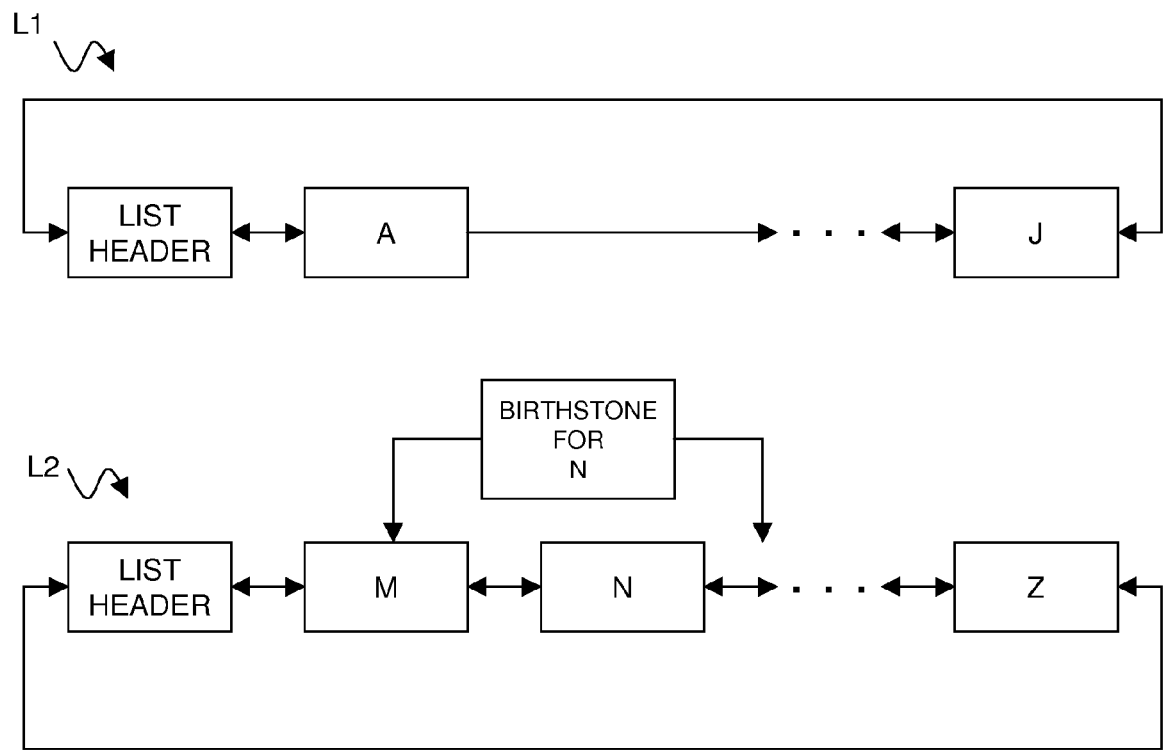
Figure 6F:
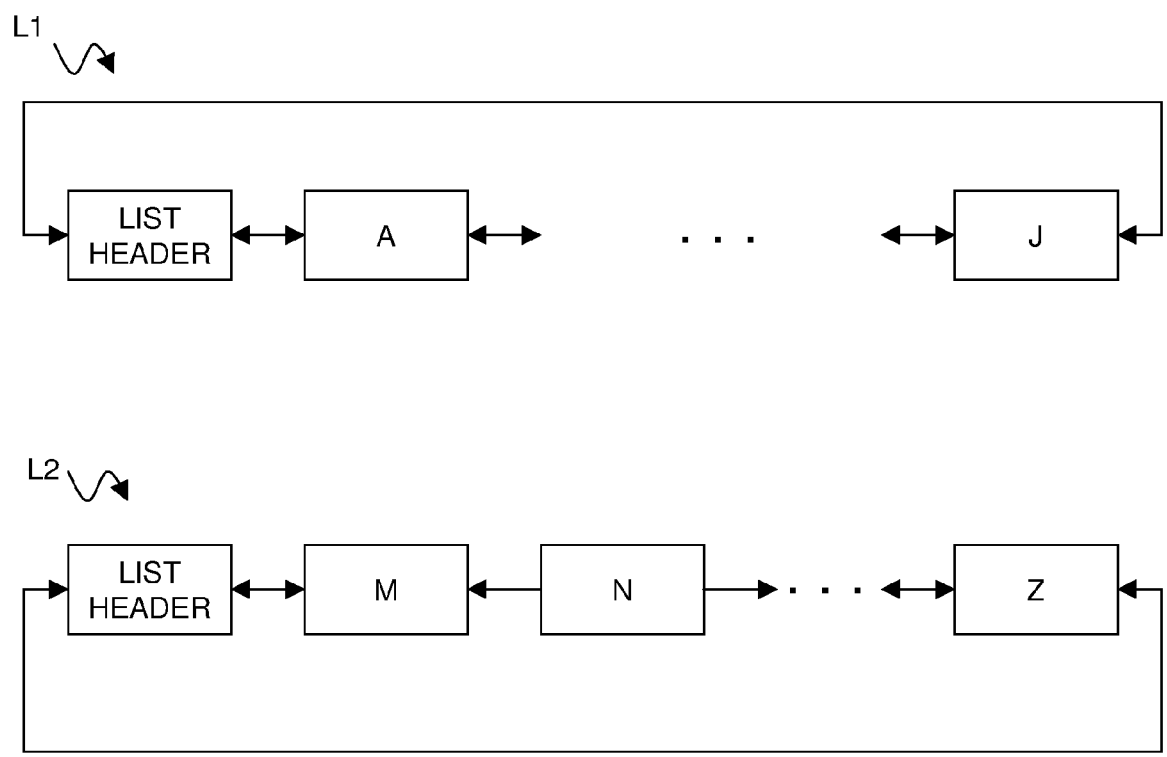
Figure 7:
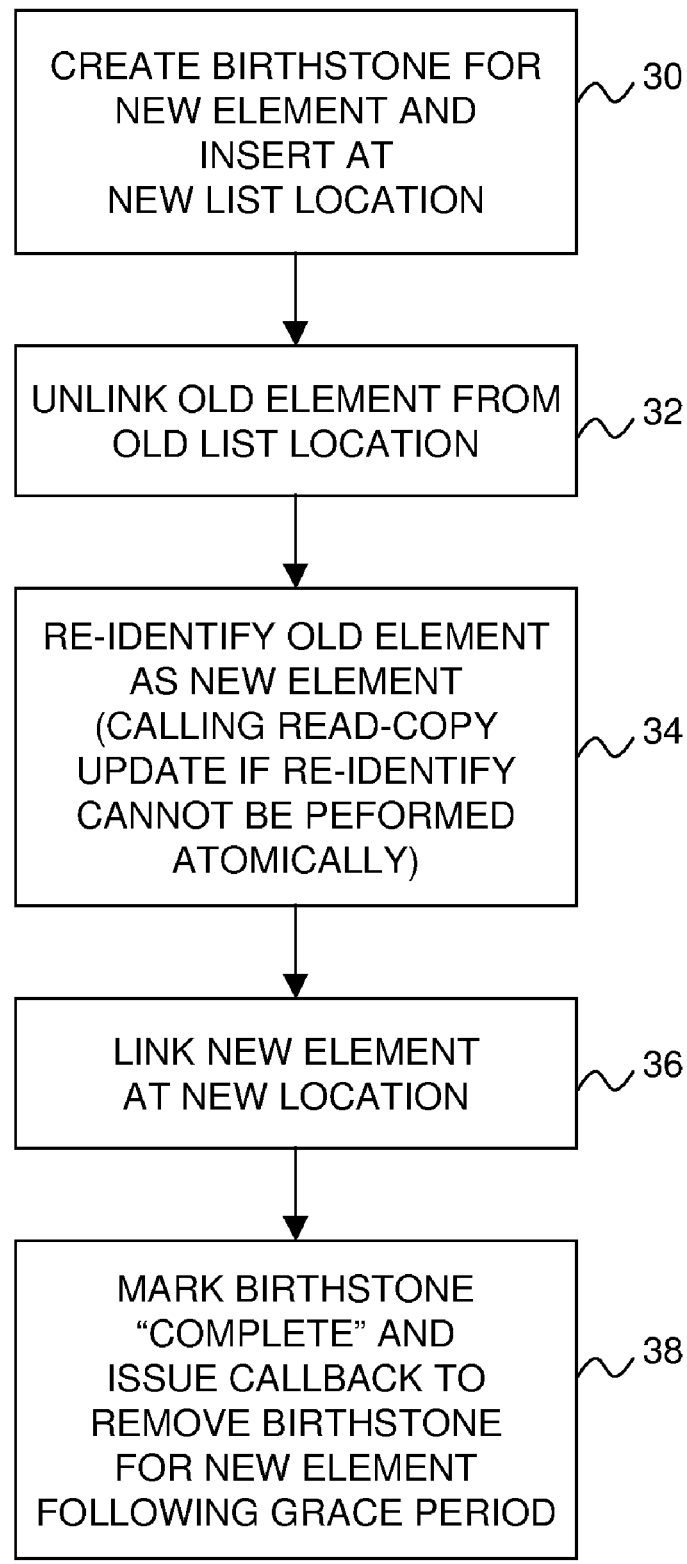
FIG. 7 is a flow diagram showing exemplary steps that may be used by an updater to move a list element between lists in accordance with the invention.

As mentioned above, the present invention applies read-copy update to the situation where a list element needs to be moved from one list to another. This is done by inserting a "birthstone" into the element's new location, which is later replaced with the actual element being moved. If a reader $22_1, 22_2 \ldots 22_n$ performing a lookup sees the birthstone, it waits for the move operation to complete before failing. FIGS. 6A-6F and the flow diagram of FIG. 7 illustrate the basic technique for a pair of circularly linked lists L1 and L2, in which element B of list L1 is to be moved to list L2, and renamed to element N in the process. FIG. 6A shows the initial state of lists L1 and L2. To initiate the move operation, the updater $18_2 \ldots 18_n$ performing the operation implements a conventional mutual-exclusion mechanism in order to prevent a concurrent move operation involving B from destructively interfering with the move operation of this example. Locking is one mutual-exclusion mechanism that may be used. As shown in step 30 of FIG. 7, once mutual exclusion has been implemented, the updater $18_2 \ldots 18_n$ creates a birthstone for N and links it into list L2. The resulting state is shown in FIG. 6B. The birthstone for N is a list element having all the attributes of the list element N that it represents, except that it is designated (using a flag or other parameter) as a temporary placeholder so that readers $22_1, 22_2 \ldots 22_n$ performing lookups on element N will know that it is a birthstone for N. Another parameter associated with the birthstone for N is a reference count showing the number of readers $22_1, 22_2 \ldots 22_n$ that are currently referencing the birthstone. This reference count is initially set to 1 when the birthstone for N is created, and is thereafter incremented and decremented by readers $22_1, 22_2 \ldots 22_n$ encountering the birthstone (as described in more detail below). As further described below, a reference count value of zero signifies to the read-copy update subsystem 20 that the birthstone can be safely removed. As can be seen from FIG. 6B, after the completion of step 30 of FIG. 7, a lookup traversing list L1 to locate element B will still succeed, while a lookup traversing list L2 to locate element N will find the birthstone for N. This will cause the reader $22_1, 22_2 \ldots 22_n$ to wait until the move of B is complete.

In step 32 of FIG. 7, element B is unlinked from list L1, and the element preceding B is linked to the element following B. This state is shown in FIG. 6C. Any lookup of element B will now fail. Because the present example includes element B being renamed to element N, step 34 of FIG. 7 is implemented to perform an element re-identification operation that results in the element's name being changed. The re-identification operation can also be used to change other identifying information, such as a parent directory identifier if the element is a file system directory entry and the file is being moved from one directory to another. If the file is moved to a new directory but not renamed, the element re-identification operation will only change the parent directory identifier. If the file is also being renamed, both its name and parent directory identifier will change. Note that the re-identification operation should be atomic. If element B cannot be re-identified atomically (e.g., there are existing references to this element), the updater $18_2 \ldots 18_n$ must call the read-copy update subsystem 20 to track a grace period. This will guarantee that no readers $22_1, 22_2 \ldots 22_n$ can be maintaining references to element B when it is re-identified. FIG. 6D shows the resultant state of element B following the completion of step 34 of FIG. 7. At this point, new lookups for element B will continue to fail, and lookups for element N will still find the birthstone for N. In accordance with POSIX requirements, any lookup for element N that succeeds will subsequently fail to find B.

It is possible as a result of step 34 that lookups for another element in the list L1, such as element J, will have been carried with element B to the list L2. That is, lookups can be "pulled" to a different list by moving a list element that is currently being consulted as part of a list traversal sequence at the time of the move. For example, if list L1 is being traversed during a lookup of element J, and the lookup is referencing element B at the same time element B is moved to list L2, the lookup for element J can be pulled to L2. This race condition can be resolved by maintaining a back pointer (not shown) from each list element to the corresponding list header element, then restarting the search if the wrong back pointer is encountered (see lookup technique below for further details). Thus, a simple check can detect and recover from this possible race.

In step 36 of FIG. 7, the newly renamed element N is linked into list L2 and the birthstone for N is unlinked so that no new lookups will find this element. FIG. 6E, shows this state. Lookups for B will continue to fail, but lookups for N now find the newly renamed element instead of its birthstone. In step 38 of FIG. 7, the birthstone for N is marked "complete," and will thereafter be removed and returned to free memory using read-copy update and the birthstone's reference count. Read-copy update is used to defer freeing the birthstone for N until a grace period has elapsed. This ensures that any readers $22_1, 22_2 \ldots 22_n$ with newly acquired references to the birthstone that did not have time to process the birthstone by the time it is unlinked, will have passed through a quiescent state. Therefore, the updater $18_1, 18_2 \ldots 18_n$ invokes the callback registration component 24 (FIG. 5) of the read-copy update subsystem 20 to schedule a callback. The grace period detection component 26 (FIG. 5) of the read-copy update subsystem 20 waits until a grace period has expired and the callback processing component 28 (FIG. 5) performs callback processing on the birthstone for N. In this case, such callback processing comprises decrementing the birthstone's reference count and testing its value. If it is zero, all readers $22_1, 22_2 \ldots 22_n$ will have completed their processing of the birthstone (which processing will include each reader first incrementing, then decrementing the reference count). This will signify that no readers can possibly maintain a reference to the birthstone. The callback processing component 28 may then safely free up the birthstone. FIG. 6F shows this state. Alternatively, if the reference count is not zero at the end of the grace period, callback processing will be terminated without freeing the birthstone. As described below in the discussion on lookup technique, the responsibility for removing the birthstone for N will now fall on the last reader $22_1, 22_2 \ldots 22_n$ waiting for the birthstone to complete. This reader will decrement the reference count to zero, then free the birthstone.

Lookup Technique for Use with Atomic Move of List Element Between Lists

Figure 8A:
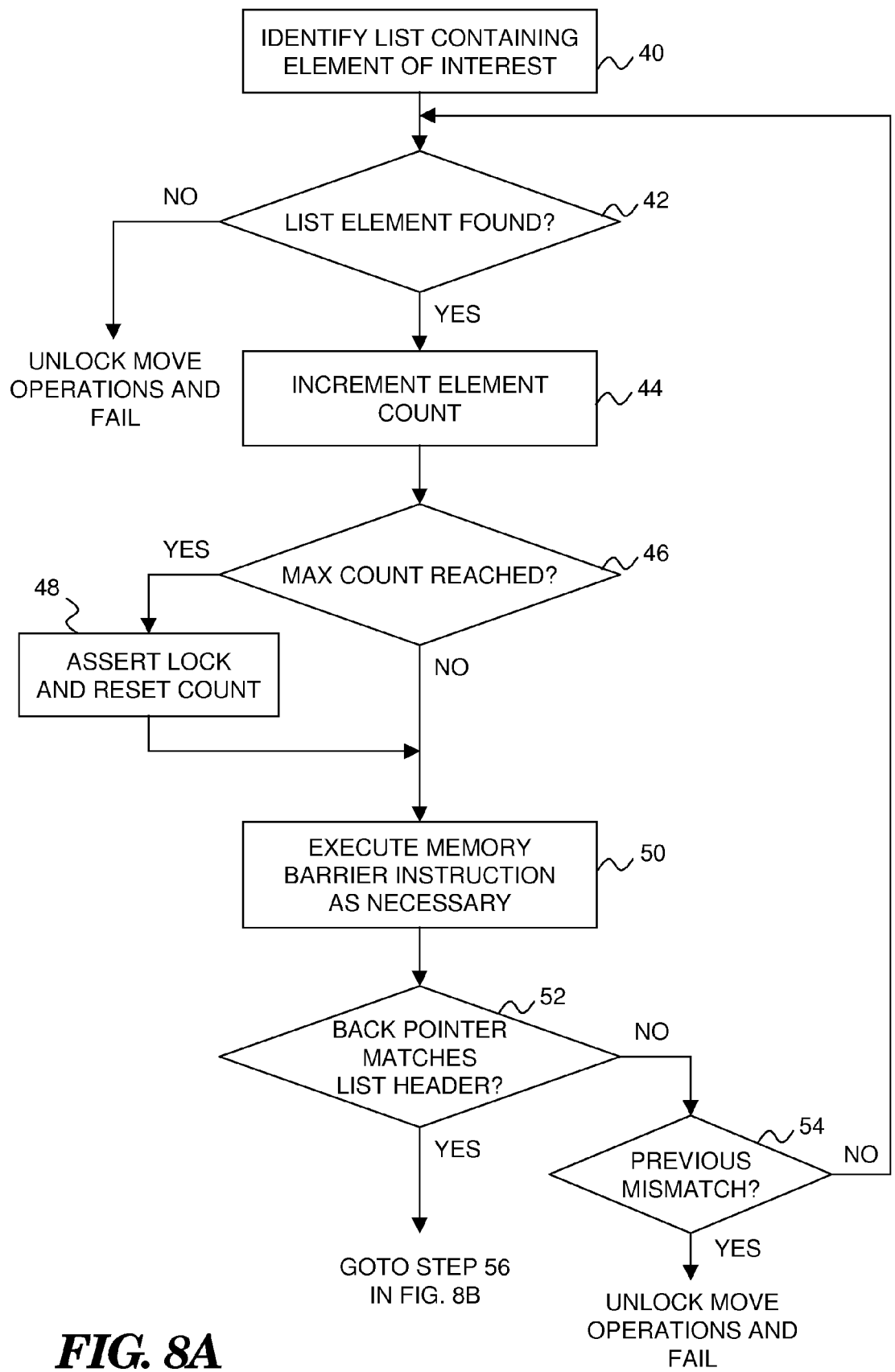
FIGS. 8A, 8B and 8C collectively illustrate a flow diagram showing exemplary steps that may be used by a reader to perform a lookup on a list element in accordance with the invention.
Figure 8B:
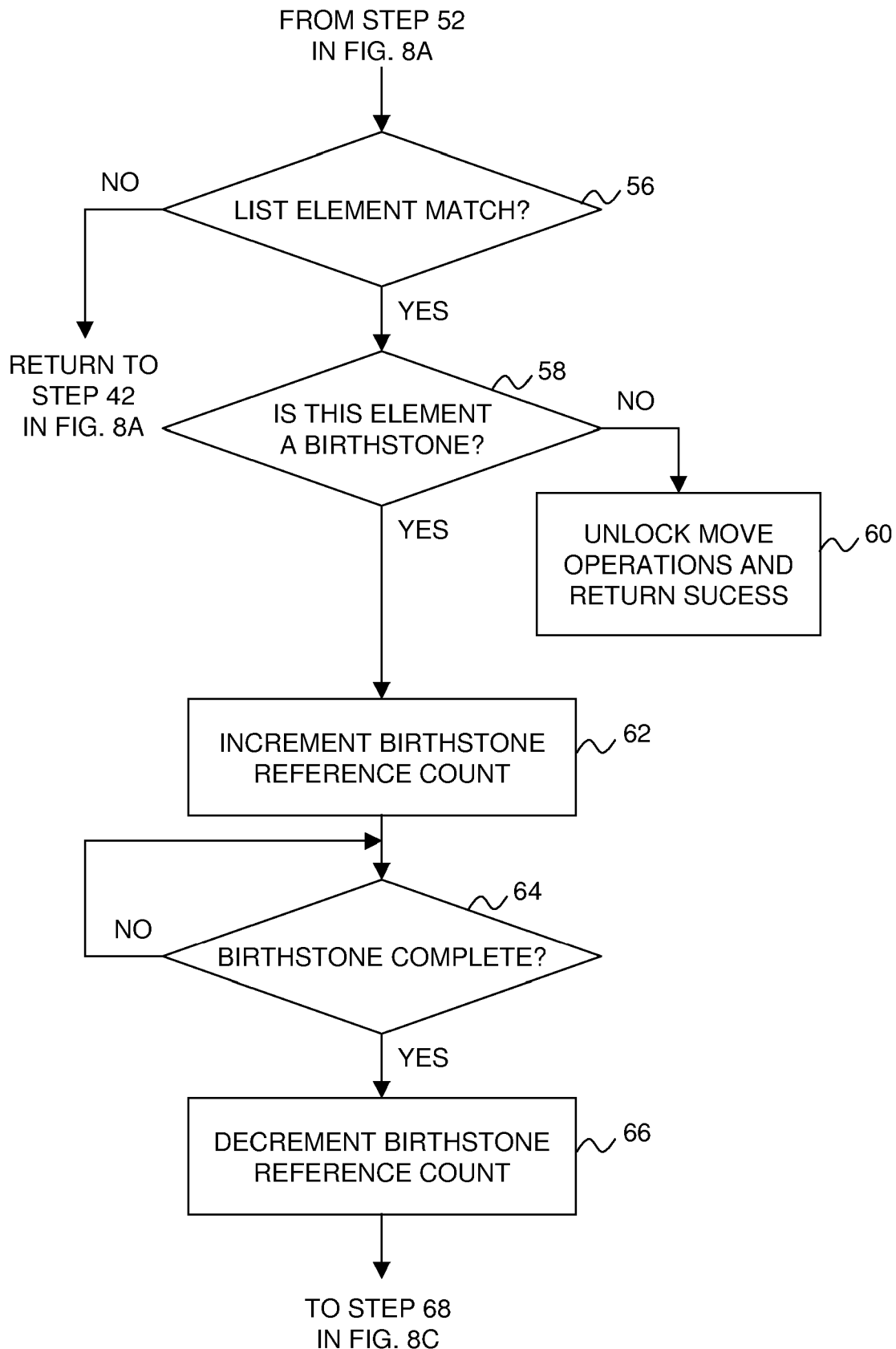
Figure 8C:
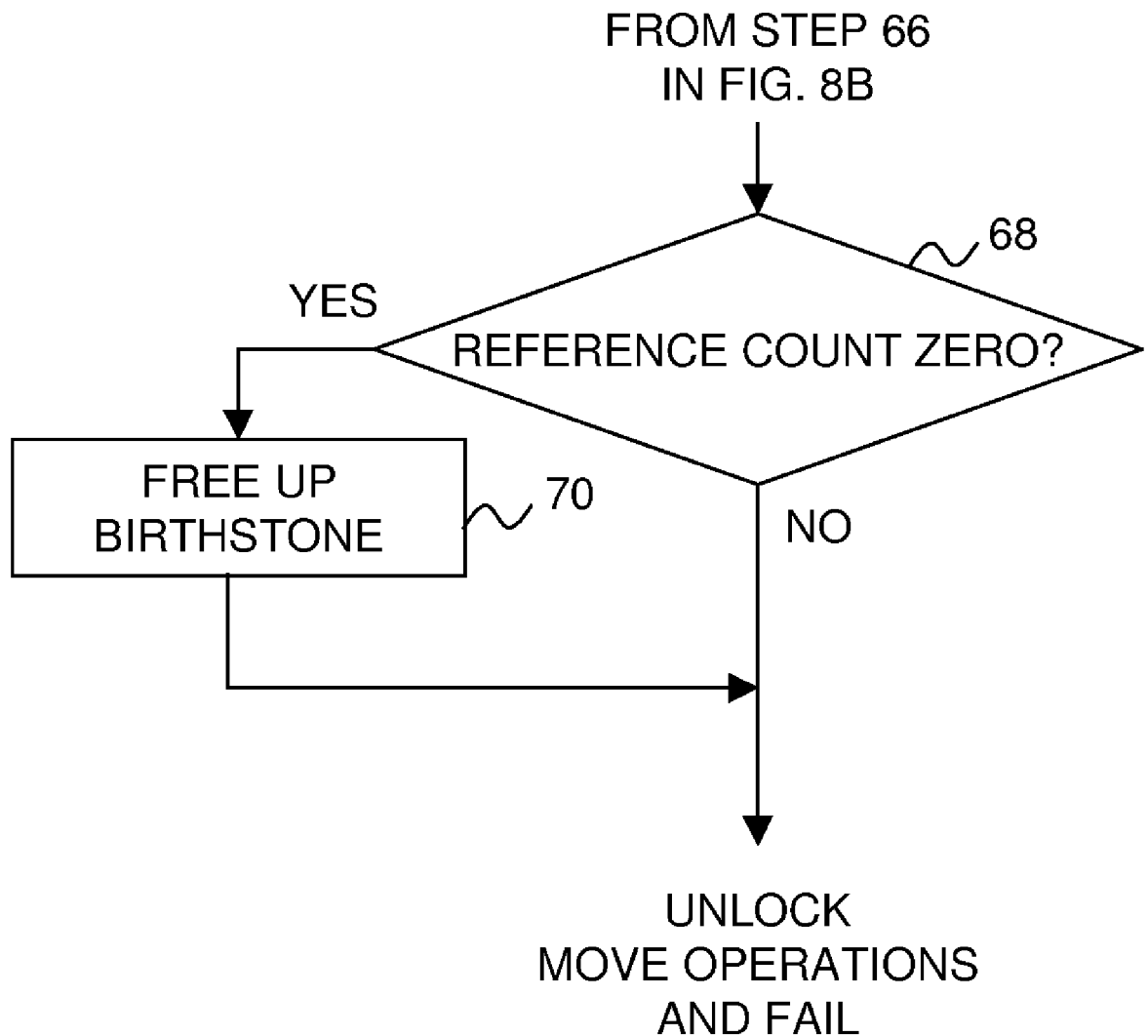

Any reader $22_1, 22_2 \ldots 22_n$ performing lookups on list elements that may be concurrently moved between lists during the lookup operation must be adapted to correctly handle this situation. FIGS. 8A-8C illustrate exemplary steps that may be performed. In step 40, the reader $22_1, 22_2 \ldots 22_n$ performing the lookup identifies the list where the element should be located. If the list represents a hash chain in a hash table, this would require locating the correct hash bucket using the applicable hash algorithm. In step 42, a loop is initiated and several actions are taken for each list element that is encountered by the lookup when traversing the list. In step 44, a count of the number of elements traversed is incremented and a test is made in step 46 whether the count exceeds a computed maximum. If it does, the reader implements a suitable lock to lock out further move operations, then resets the count to zero in step 48, and continues. The reason for doing this is that a sequence of moves that results in an element being returned to the same list it started in could possibly cause the lookup to revisit some elements, potentially looping indefinitely through the list. The count is used so that if a large number of elements are encountered, a lock can be implemented to prevent further move operations on the target element. Note that this check can be disposed of if move operations occur infrequently. One way to enforce this condition is to require that a grace period elapse between each move operation, although this could unacceptably throttle the rate at which moves occur. Another alternative would be to require that a grace period elapse for a given number of move operations, although this could unnecessarily block move operations if grace periods are blocked by some unrelated operation. A further alternative would be to block move operations if an ongoing grace period extends for too long, although this could also unnecessarily block move operations if grace periods are blocked by some unrelated operation. Despite the foregoing drawbacks, one significant advantage of this limitation on move operations is that it removes the reader $22_1, 22_2 \ldots 22_n$ from the burden of the counter check and locking sequence of steps 46 and 48, thus speeding up the lookup, perhaps significantly.

Another way to prevent indefinite looping during lookups is to have the updater $18_2 \ldots 18_n$, when manipulating an element, check to see if the element will end up in the same list that it started in. If so, the updater $18_2 \ldots 18_n$ can insert a birthstone before the element rather than replacing it. This guarantees that a move cannot cause a lookup to visit more entries than it would otherwise have to see. However, for this to work, an element that has been moved cannot be moved again until all in-flight lookups complete. Otherwise, lookups could be recycled by renaming an element back and forth between two lists. As described above, this can be guaranteed by having the updater $18_2 \ldots 18_n$ refuse to move a recently moved element until after a grace period has elapsed since its previous move.

If a count procedure is to be used per steps 46 and 48 of FIG. 8A, the maximum count value may be computed in a number of ways. For example, a count of the number of entries in each list can be maintained in that list's header element. If the lookup traverses more than this number of entries, the reader is very likely traversing elements multiple times due to multiple moves of the element being searched. The reader could also keep a count of the total number of entries in the shared list set 16, and use a function of that count and the number of lists to estimate the maximum list length. Prior art techniques are available for performing this calculation on hash tables.

No matter which maximum count computation technique is used, the readers $22_1, 22_2 \ldots 22_n$ should always be sensitive to excessively locking out move operations. Thus, the count function should be adjusted to choose a desired tradeoff between readers $22_1, 22_2 \ldots 22_n$ potentially having to traverse large numbers of list elements and updaters $18_1, 18_2 \ldots 18_n$ performing move operations being needlessly locked out.

In step 50 of FIG. 8A, an optional (read) memory-barrier instruction can be executed on processors with extremely weak memory-consistency models that do not respect data dependencies. In step 52, the current list element's back pointer (not shown) to its list header element is checked to determine if the lookup operation has been pulled off of the list on which the lookup began (as discussed above). If it has, the back pointer will have changed and the reader $22_1$, $22_2 \ldots 22_n$ must go back to the beginning of the original list and retraverse it. If in step 52, the current element's back pointer does not match the original list header element on which the lookup began, the updater needs to return to the original list and retraverse it (without resetting the element count). But first, a test is made in step 54 to determine if there has been a previous retraversal that ended up at the same element with the same non-matching back pointer. If so, the lookup is failed and any move operations that were locked out are allowed to continue. Otherwise, the lookup goes back to the original list and retraverses it beginning in step 42. If there was a back pointer match in step 52, the lookup operation moves to step 56 in FIG. 8B and tests whether the current element is the lookup target. If not, the lookup operation returns to step 42 and proceeds to the next list element in the current list, if one exists. If a name match is found in step 56, a test is made in step 58 whether the current element is a birthstone. If not, the lookup returns success in step 60 and any move operations that were locked out are allowed to continue. If the current element is a birthstone, the lookup operation proceeds to step 62 in which any rename operations that were locked cut are allowed to continue and the reader $22_1, 22_2 \ldots 22_n$ atomically increments the birthstone's reference count. In step 64 the reader $22_1, 22_2 \ldots 22_n$ waits for the move to complete and then moves to step 66 in which the birthstone's reference count is atomically decremented. As described in more detail below, there are a number of ways that a reader $22_1, 22_2 \ldots 22_n$ can wait for a move to complete. Although this will cause the lookup to wait, this wait will be no more severe than the delay inherent in traditional algorithms where list updates lock out all lookups. In step 68 of FIG. 8C, the reference count is tested. If it is zero, the birthstone is freed in step 70. In either case, any move operations that were locked are allowed to continue and the lookup is failed. If the lookup finds no elements matching the lookup target, step 42 will result in no more elements being found and the lookup will fail. Any move operations that were locked out will then be allowed to continue.

As indicated, there are a number of ways a reader $22_1$, $22_2 \ldots 22_n$ can wait for a move operation to complete. Each has different advantages in different situations. For example, one technique would be to have the lookups block (sleep) on a global semaphore (sometimes referred to as a "sleeplock"). This minimizes memory use, because there is only one semaphore. However, it can result in needless wakeups when there are multiple moves executing in parallel. It also causes the system to incur the overhead of an additional context switch each time a lookup encounters a birthstone. Another alternative would be to have lookups block on a per-element semaphore. This requires additional memory, but eliminates the needless wakeups. It still incurs the context-switch overhead. A further alternative would be to have the lookups spin (busy wait) on a global lock. This, although possible, is almost always undesirable due to the potential lock contention overhead. A still further alternative would be to have lookups spin on a per-element lock. This likely requires no additional memory, and this method is preferred as long as the move operation does not block and is likely to complete quickly.

Atomic Rename( ) Using Read-Copy Update

The atomic POSIX renames problem described by way of background above can be solved using the above-described technique to insert a "birthstone" at the destination of a file system directory entry to be renamed. As per the discussion above, when a lookup operation encounters a birthstone that matches the lookup target, it blocks until the birthstone is marked "completed", and then fails (and is presumably then retried). This ensures that any operation that fails to see the old file name will see the new file name on any subsequent lookup, and also ensure that any operation that sees the new file name will fail to see the old file name, as required by POSIX semantics.

Figure 9:
FIG. 9 is a diagrammatic representation of a birthstone element that may be used in accordance with an exemplary embodiment of the present invention that performs a POSIX rename( ) operation on a list of directory entry elements.

As shown in FIG. 9, an exemplary birthstone 80 for use in the POSIX rename( ) operation may be constructed with the same fields used in other directory entry elements, but with the addition of a refcount field and a flags field containing a flag to indicate when the birthstone is "complete," as follows:

refcount: a reference counter
flags: status flags
parent: a pointer to the parent directory
hash: a list of entries in the same hash chain (in systems using a global hash table for pathname-component translation)
hashchain: a pointer to the head of the hash chain (in systems using a global hash table for pathname-component translation)
child: a list of siblings that are children of the same directory
subdirs: list of children of this directory
name: a pointer to a structure containing the pointer to the name, its length, and a hash value (in systems using a global hash table).

The rename( ) operation is implemented according to the generalized atomic move procedure described above, with the target list element being a file system directory entry and the list being a doubly-linked circular directory list in a directory entry cache or a hash chain in a directory entry hash table. As is known, the rename( ) operation can be used to change a file's name without moving it to a different directory, or it can move the file to a different directory without changing its name, or it can both rename the file and move it to a different directory. Because of the way lists are implemented in a directory entry cache or hash table, the rename( ) operation usually results in a directory entry element being moved from one list to another. Of course, if the rename( ) operation results in the directory entry element remaining on the same list, the birthstone procedure described herein may not be necessary. If the element name can be renamed atomically, then such an operation can be used. Lookups will see either the old name or the new name.

Assuming that a birthstone is required, it will typically have the same name, hash, hash chain, child, and parent as the element will have after being renamed, but with the requisite indication (e.g., a flag value, bit or other parameter) in the "flags" field of FIG. 9 that this is a birthstone.

When using the generalized atomic move operation of FIG. 7 to perform a rename( ) operation using birthstones, the re-identification step 34 requires special consideration when there is a global hash table (see below). Special handling is also required if short names are kept within the list element itself (see below).

Special Handling for Global Hash Table

As mentioned above, the re-identification step 34 of FIG. 7 will require an update to a directory entry element's name, but not its parent directory pointer, if the corresponding file is being renamed but not moved to a new directory. Similarly, the re-identification step 34 will require an update to a directory entry element's parent directory pointer, but not its name, if the corresponding file is keeping its old name and is just being moved to a different directory. However, if the corresponding file is being renamed and moved to a new directory, the re-identification step 34 of FIG. 7 will result in the directory entry element's name and parent directory pointer both being changed.

For best results in this situation when there is a global hash table, the name and parent pointer of each directory entry element should be changed atomically. Although it is possible to change them one at a time, doing so makes lookups considerably more complex. This atomic update may be accomplished by placing the parent directory pointer into a structure that also contains the element's name, so that the "name" field of the element points to both of them (and so that the "parent" field is not required). However, if the parent pointer is frequently referenced, this might have unacceptable performance consequences. In this case, it may be better to keep the "name" and "parent" fields, and also provide a special pointer in each element that is normally NULL, but, when non-NULL, points to a special structure containing both the parent pointer and the name. In some cases, this structure can simply be another list element.

It will be appreciated that the special-pointer approach should provide some way of propagating the atomic update to the special name/parent pointer structure back to the parent and name stored in the main element containing the pointer. This can be accomplished by registering a callback to invoke a function (after a grace period elapses) that does the following:

a) Copy the new name and the new parent pointer from the separate storage back into the list element. This may be done safely because the grace period has elapsed, ensuring that no processes are still referencing the old name and parent pointer.
  b) On processor architectures with weak memory consistency, execute a (write) memory-barrier instruction.
  c) Copy the special pointer to a temporary variable.
  d) Set the special pointer to NULL.
  e) Register a callback to free up the special structure that contained the new name and parent pointer (which is now pointed to by the temporary variable) after a grace period elapses.

Special Handling for Short Names in Elements

If a directory entry's name is stored directly in the list element (and not as a pointer), it cannot be changed atomically. Therefore, the new name must be placed in separate storage as a long name would be, even if the new name is short enough to fit into the list element. This allows the name to be changed atomically. When it is desirable to move the short name back into the list element, a callback can be registered to invoke a function (after a grace period elapses) that does the following:

a) Copy the new name from the separate storage back into the list element. This may be done safely because the grace period has elapsed, ensuring that no processes are still referencing the old name.
  b) On processor architectures with weak memory consistency, execute a (write) memory-barrier instruction.
  c) Copy the "name" pointer to a temporary variable.
  d) Point the "name" pointer to the internal storage.
  e) Register a callback to free up the old name (pointed to by the temporary variable) after a grace period elapses.

Lookup of Directory Entry Element while Taking into Account Concurrent Rename( )

In cases where a directory cache or hash table is subject to the above-described rename( ) operation, the lookup procedure described above in connection with FIGS. 8A-8C may be used for performing concurrent file name lookups. The only refinement occurs at step 52 of FIG. 8A depending on whether the directory entry being renamed( ) is a list element in a directory list or a list element in a hash table chain. In the former case, the list on which the element is located will be the usual linked list of directory entries that extend from a parent directory entry through all of the entry's representing subdirectories or files of the parent. Step 52 of FIG. 8A will then check the element's "parent" pointer against the parent directory entry at the head of the list where the lookup started. If the list on which the element is located is a hash chain in a hash table, step 52 of FIG. 8A will check the element's "hashchain" pointer against the initial hash bucket list element where the lookup started. In all other respects, the lookup operation of FIGS. 8A-8C remains the same.

Figure 10:
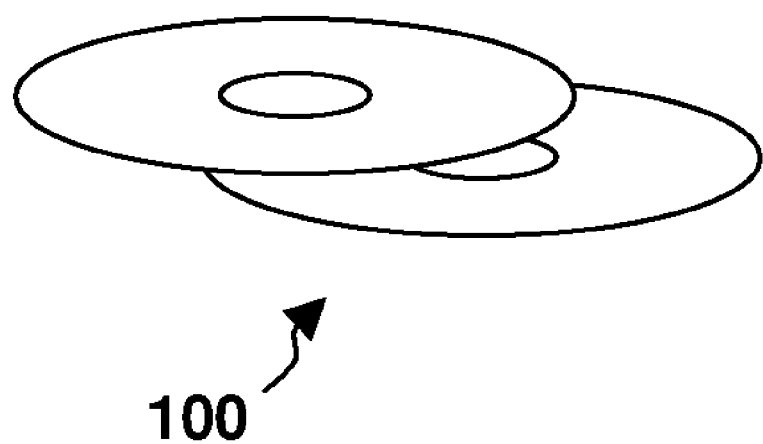
FIG. 10 is a diagrammatic illustration of storage media that can be used to store a computer program product for implementing read-copy update grace period detection functions in accordance with the invention.

Accordingly, a technique has been disclosed for atomically moving list elements from one list to another using read-copy update. It will be appreciated that the foregoing concepts may be variously embodied in any of a data processing system, a machine implemented method, and a computer program product in which programming means are recorded on one or more data storage media for use in controlling a data processing system to perform the required functions. Exemplary data storage media for storing such programming means are shown by reference numeral 100 in FIG. 10. The media 100 are shown as being portable optical storage disks of the type that are conventionally used for commercial software sales. Such media can store the programming means of the invention either alone or in conjunction with an operating system or other software product that incorporates read-copy update functionality. The programming means could also be stored on portable magnetic media (such as floppy disks, flash memory sticks, etc.) or on magnetic media combined with drive systems (e.g. disk drives) incorporated in computer platforms.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for performing a read operation lookup of a target list element that is subject to being atomically moved from a first list to a second list by a concurrent move operation, comprising:
    initiating a read operation list traversal beginning at a first list element in said second list; and
    upon encountering a list element that is a placeholder for said target list element in said second list that was generated as a result of said concurrent move operation involving said target list element being moved from said first list to said second list, waiting until said placeholder indicates that said move operation has completed, and thereafter returning read operation failure so that said lookup can be retried.

2. A method in accordance with claim 1, further including maintaining a count of elements traversed by said lookup and asserting a lock against concurrent move operations if said count reaches a computed maximum.

3. A method in accordance with claim 1, further including determining whether said lookup has been pulled from one list to another as a result of a concurrent move operation, and if true, returning to the initial list being traversed.

4. A method in accordance with claim 1, further including incrementing a reference count in said placeholder upon encountering said placeholder and decrementing said reference count if said placeholder indicates that said concurrent move operation has competed.

5. A method in accordance with claim 1, wherein said waiting on said placeholder comprises one of blocking on a global semaphore, blocking on a per-element semaphore, spinning on a global lock, and spinning on a per-element lock.

6. A data processing system adapted to perform a read operation lookup of a target list element that is subject to being atomically moved from a first list to a second list by a concurrent move operation, comprising:
    means for initiating a read operation list traversal beginning at a first list element in said second list; and
    means responsive to encountering a list element that is a placeholder for said target list element in said second list that was generated as a result of said concurrent move operation involving said target list element being moved from said first list to said second list for waiting until said placeholder indicates that said move operation has completed, and thereafter returning read operation failure so that said lookup can be retried.

7. A system in accordance with claim 6, further including means for maintaining a count of elements traversed by said lookup and for asserting a lock against concurrent move operations if said count reaches a computed maximum.

8. A system in accordance with claim 6, further including means for determining whether said lookup has been pulled from one list to another as a result of a concurrent move operation, and if true, returning to the initial list being traversed.

9. A system in accordance with claim 6, further including means for incrementing a reference count in said placeholder upon encountering said placeholder and decrementing said reference count if said placeholder indicates that said concurrent move operation has competed.

10. A system in accordance with claim 6, wherein said means for waiting on said placeholder comprises one of means for blocking on a global semaphore, means for blocking on a per-element semaphore, means for spinning on a global lock, and means for spinning on a per-element lock.

11. A computer program product for performing a read operation lookup of a target list element that is subject to being atomically moved from a first list to a second list by a concurrent move operation, comprising:
    one or more data storage media;
    means recorded on said data storage media for programming a data processing platform to operate during a read operation, as by:
    initiating a read operation list traversal beginning at a first list element in said second list; and
    upon encountering a list element that is a placeholder for said target list element in said second list that was generated as a result of said concurrent move operation involving said target list element being moved from said first list to said second list, waiting until said placeholder indicates that said move operation has completed, and thereafter returning read operation failure so that said lookup can be retried.

12. A computer program product in accordance with claim 11, further including maintaining a count of elements traversed by said lookup and asserting a lock against concurrent move operations if said count reaches a computed maximum.

13. A computer program product in accordance with claim 11, further including determining whether said lookup has been pulled from one list to another as a result of a concurrent move operation, and if true, returning to the initial list being traversed.

14. A computer program product in accordance with claim 11, further including incrementing a reference count in said placeholder upon encountering said placeholder and decrementing said reference count if said placeholder indicates that said concurrent move operation has competed.

15. A computer program product in accordance with claim 11, wherein said waiting on said placeholder comprises one of blocking on a global semaphore, blocking on a per-element semaphore, spinning on a global lock, and spinning on a per-element lock.

* * * * *